May 5, 1942.  E. S. PURINGTON  2,281,995
PHASE COMPARING SYSTEM
Filed April 27, 1939   2 Sheets-Sheet 1

INVENTOR
ELLISON S. PURINGTON.
BY
ATTORNEY

INVENTOR
ELLISON S. PURINGTON.
BY
ATTORNEY

Patented May 5, 1942

2,281,995

UNITED STATES PATENT OFFICE 2,281,995

PHASE COMPARING SYSTEM

Ellison S. Purington, Gloucester, Mass., assignor, by mesne assignments, to Radio Corporation of America, New York, N. Y., a corporation of Delaware Application April 27, 1939, Serial No. 270,429

8 Claims. (Cl. 172—245)

This invention relates to phase comparing circuits of the type using rectifiers or other electronic devices.

The invention provides phase comparing circuits in which the voltages to be compared are supplied to a pair of rectifiers in different phase relationships. One of the voltages may, for example, be applied in the same phase to a pair of rectifiers and the other voltage may be applied in opposite phases to the two rectifiers. In a circuit of this type the differential effect of the rectified currents may be utilized for actuating a work circuit or indicating device for comparing the phases. In a further embodiment the two voltages are supplied to a pair of rectifiers in such a way that the rectified voltages are proportional to the vector sum and vector difference respectively of the supplied voltages. The system may be applied to a pair of space discharge devices having three or more electrodes, such, for example, as cathode, plate and grid by applying one of the voltages to the grids, for example, of the two devices in the same phase and applying the other voltage to the plates, for example, of the respective devices in opposite phase so that the anode currents are differently characterized in accordance with the phase relationships between the supplied voltages.

Various other objects and advantages will be apparent as the nature of the invention is more fully disclosed.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which—

Like reference characters denote like parts in the several figures of the drawings.

In the following description and in the claims parts will be identified by specific names for convenience, but they are intended to be as generic in their application to similar parts as the art will permit.

Figure 1:
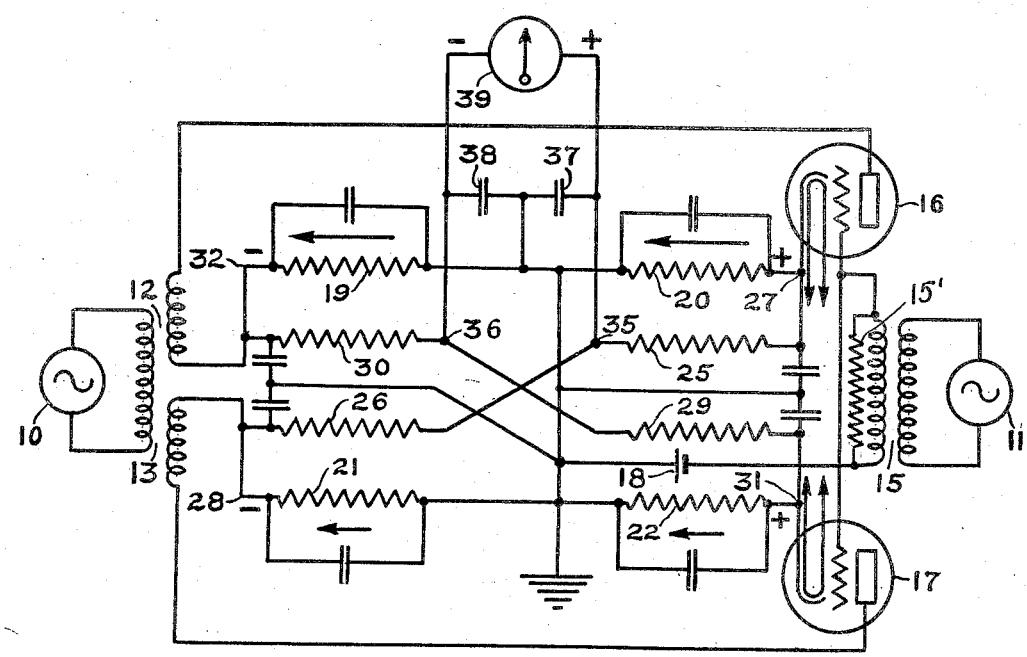
Fig. 1 is a circuit diagram illustrating an electronic phase comparator using two triode rectifiers.

Referring to the accompanying drawings and more particularly to Fig. 1, two signal sources 10 and 11 are provided, which are connected through two sets of transformers 12—13 and 15 to the plate and grid circuits respectively, of two balanced three-electrode tubes 16 and 17. A battery 18 may be provided to bias the grids of the tubes 16 and 17. The plate circuits of the tubes 16 and 17 include two sets of series connected resistors 19, 20 and 21, 22 respectively, which are preferably of equal value. Two resistors 25 and 26 are bridged in series from the positive end 27 of resistor 20 to the negative end 28 of resistor 21 and two resistors 29 and 30 are bridged in series from the positive end 31 of resistor 22 to the negative end 32 of resistor 19. The four resistors 25, 26, 29 and 30 are preferably equal and of much higher value than the four resistors 19—22.

The junctions 35 and 36 of the resistors 25—26 and 29—30 respectively are by-passed to ground by condensers 37 and 38, respectively, and are connected to a work circuit such as a galvanometer 39. Condensers may be bridged across resistors 19, 20, 21, and 22 if desired.

In the operation of the form of the invention shown in Fig. 1 energy is fed from the two signal sources 10 and 11 into the comparator system by the transformers 12—13 and 15 to energize the plate and grid circuits, respectively, of the tubes 16 and 17. The plate circuits of the tubes 16 and 17 are driven by equal couplings in a push-pull manner, so that if the tube 16 is rectifying the tube 17 is idle and vice versa, but the grids are so connected that both are simultaneously positive or simultaneously negative.

If the two applied A. C. voltages are in phase, for example, so that the grid of tube 16 is at highest potential when the tube 16 is operative, then the grid of tube 17 will be at lowest potential when the tube 17 is operative. The tube 16 therefore, acts as a low impedance rectifier and the tube 17 as a high impedance rectifier, with more energy rectified by the tube 16 than by the tube 17. This condition is indicated by the length of the arrows representing the D. C. current components through the resistors 19, 20 and 21, 22. If the relative phases were reversed with the tube 17 becoming the low impedance rectifier and the tube 16 the high impedance rectifier the currents through the resistors 21 and 22 would be greater than those through the resistors 19 and 20.

If the two plate and grid driving voltages are in phase quadrature, that is 90° out of phase, the average impedance of the tube 16 during its operation will be the same as the average impedance of the tube 17 during its operation and all output currents will be equal. Under these conditions points 27 and 28 will be positive and negative respectively by the same amount with respect to ground and point 35 which is at a potential midway between the potentials of points 27 and 28 will be at ground potential. Similarly point 36 will be at ground potential. Phase quadrature relation of the signals is therefore indicated by the equality of the D. C. potentials of the points 35 and 36, giving a zero indication on the center point galvanometer. It will be understood that rectifier output by-pass condensers may be assumed to be sufficiently large so that A. C. components of the rectified output pass through the condensers and only D. C. components pass through the resistors. If this is not the case, then the potential of points on the output network may be considered as averaged over an A. C. cycle.

If due to departure from the phase quadrature relation of the signals the D. C. output of the rectifier tube 16 becomes greater than the D. C. output of the rectifier tube 17, as indicated by the length of the arrows, point 27 will be more positive than point 28 is negative with respect to ground so that mid point 35 will be positive. Similarly point 31 will be less positive than point 32 is negative with respect to ground so that mid point 36 will be negative. The departure from phase quadrature will be indicated by the pointer of the galvanometer 39 moving, say for example, to the right due to the point 35 being positive and the point 36 negative as indicated by the + and − signs. If the departure from phase quadrature is in the opposite sense the point 35 will be negative and the point 36 positive so that the pointer of the galvanometer 39 will move to the left.

Signal source 10 is loaded by both transformers 12 and 13 so that if the load on one increases the load on the other decreases and in this way the load is fairly independent of the phase relations. The transformer 15 may be suitably loaded if desired by a resistance 15' across the secondary, so that both signal sources 10 and 11 will be substantially equally loaded. In this way the galvanometer 39 will give a zero indication when the two signal sources 10 and 11 are in phase quadrature. The response in the work circuit is independent of the relative amplitudes of the supplied voltages.

Figure 2:
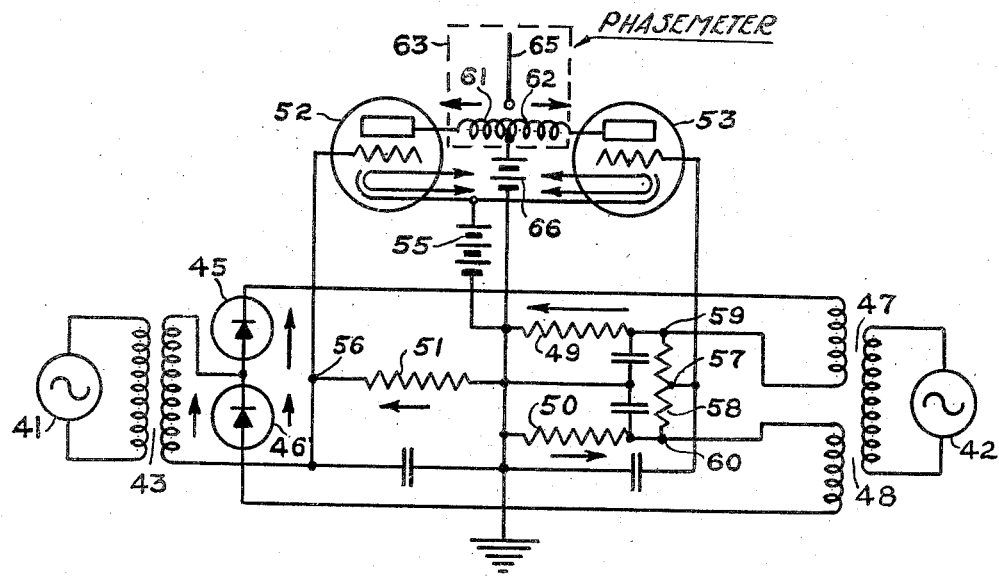
Fig. 2 depicts diagrammatically a modified form of the invention using two diode rectifiers.

Referring to the modified form of the invention shown in Fig. 2 two signal sources 41 and 42 are provided, the source 41 being coupled by a transformer 43 to two diode rectifiers 45 and 46 and the source 42 being coupled through a transformer 47 to the rectifier 45 and through a transformer 48 to the rectifier 46. Output resistors 49, 50 and 51 are connected in the circuits of the rectifiers 45 and 46. The resistors 49 and 50 are preferably about twice the value of the resistor 51. These resistors may be by-passed by suitable condensers to improve the efficiency of rectification.

A work circuit comprising two triode tubes 52 and 53 is provided, the cathodes of which are positively biased by a battery 55. The grid of the tube 52 is connected to a point 56 at one end of the resistor 51 and the grid of the tube 53 is connected to a point 57 forming a center tap on a high resistance resistor 58 which is bridged between the ends 59 and 60 of the resistors 49 and 50. The plates of the tubes 52 and 53 are connected through the coils 61 and 62 of a phasemeter 63 which is provided with a pointer 65. A plate battery 66 is supplied for driving the plate circuits of the tubes 52 and 53.

In the operation of the form of the invention depicted in Fig. 2 the signal sources 41 and 42 drive the rectifiers 45 and 46, the voltage for driving the rectifier 45 being the vector sum of the voltages from the transformers 43 and 47 and the voltage for driving the rectifier 46 being the vector sum of the voltages from the transformers 43 and 48. The transformers 47 and 48 are so designed that the rectifiers 45 and 46 are actuated in accordance with the vector sum and vector difference of the voltages supplied by sources 41 and 42. These sum and difference voltages will be equal if the two signal sources 41 and 42 are in phase quadrature. Under these conditions the current through the resistor 51 will be zero as this measures the difference in the currents flowing through resistors 49 and 50 which will be equal and in opposite directions as shown by the arrows.

The points 59 and 60 will therefore be equally positive and negative respectively with respect to ground and the point 57 will be at ground potential. As there is no current flowing through resistor 51 the point 56 will also be at ground potential. Thus phase quadrature of the signal sources 41 and 42 is indicated by equality of the D. C. potentials of the output points 56 and 57. Under these conditions the D. C. output currents through the coils 61 and 62 from the tubes 52 and 53 will be equal and in opposite directions as indicated by the arrows, so that their effect will be balanced on the pointer 65 and its indication will be zero.

When the signal sources 41 and 42 are not in phase quadrature the vector sums of the currents rectified by the rectifiers 45 and 46 will be unequal and the currents through the resistors 49 and 50 will also be unequal as indicated by the length of the arrows. The difference of these two currents will then flow through the resistor 51.

Under these conditions the point 59 will be more positive than the point 60 is negative with respect to ground so that the point 57 will have a positive potential above ground. As there is current flowing through the resistor 51 in the direction of the arrow the point 56 will have an equal negative potential with respect to ground. The positive and negative potentials of the points 57 and 56 are applied to the grids of the tubes 53 and 52 respectively which causes a larger current to flow through the coil 62 than through the coil 61 thus causing the pointer 65 to be deflected to the right.

With the opposite phase relations of the signal sources 41 and 42 the relative intensities of the currents flowing through the rectifiers 45 and 46 and the resistors 49, 50 and 51 will be reversed, so that the point 56 will become positive and the point 57 negative. This will cause positive potential to be applied to the grid of the tube 52 and negative potential to be applied to the grid of the tube 53 thus causing a larger current to flow through the coil 61 than through the coil 62. Under these conditions the pointer 65 will be moved to the left to indicate an opposite phase relationship.

It is to be understood that the work circuit of Fig. 2 may be substituted in the system of Fig. 1 or vice versa and that other work circuits may be used. Representative circuits have been shown for purposes of illustration only.

Figure 3:
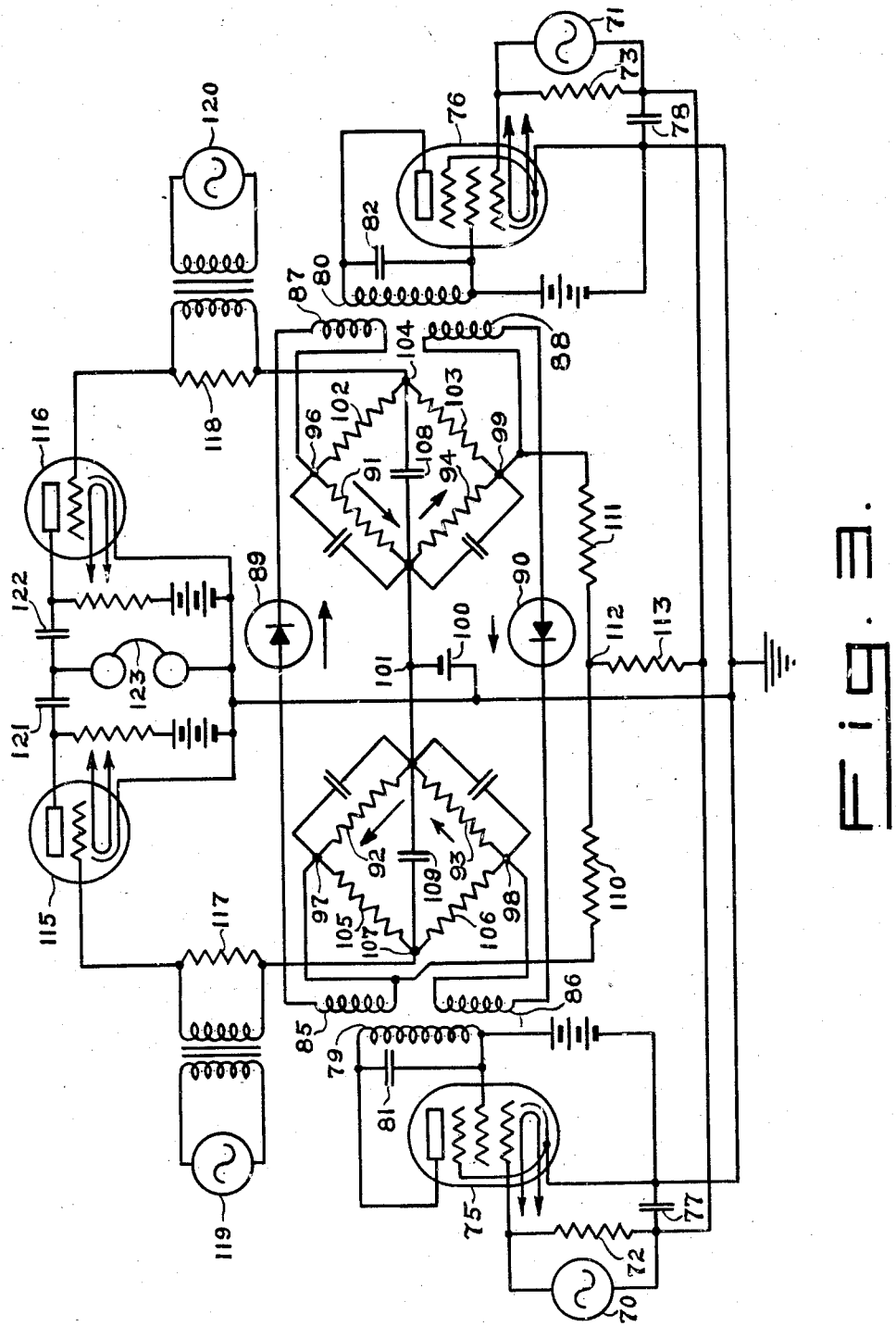
Fig. 3 is a circuit diagram illustrating a balanced system using two diode rectifiers with automatic volume control.

Referring to the modified form of the invention shown in Fig. 3, two signal sources 70 and 71 are provided which are connected across two resistors 72 and 73 which in turn are connected in the grid circuits to two pentode tubes 75 and 76. The plate circuits of the tubes 75 and 76 are connected to coils 79 and 80, which if desired, may be tuned to the frequency of operation by condensers 81 and 82.

The coils 79 and 80 are respectively inductively coupled to two pairs of equal coils 85, 86 and 87, 88 one of which, coil 88 for example, is reversed in sense of coupling from the others. The coils 85—88 are connected to two equal rectifiers 89 and 90 and to four equal output resistors 91—94 at points 96—99, which are by-passed by suitable condensers. The whole system may be negatively biased by a battery 100 connected at point 101. Two output resistors 102 and 103 are connected from points 96 and 99 to a point 104 and two output resistors 105 and 106 are connected from points 97 and 98 to a point 107. By-pass condensers 108 and 109 are connected between the points 104 and 107 and the point 101 respectively.

For volume control purposes two high resistance valued resistors 110 and 111 may be connected from the points 97 and 99 to a point 112 which is connected by a resistor 113 to the grid return ends of the resistors 72 and 73. The resistors may be by-passed by condensers 77 and 78.

The work circuit of Figs. 1 or 2 may be used with this comparing circuit. A specific embodiment of a different type of work circuit is shown, however, for purposes of further illustration, which involves a keyed amplifier comprising two tubes 115 and 116 the grids of which are connected through two resistors 117 and 118 to the points 107 and 104 respectively. Two sources of audio signal energy 119 and 120, which are of different frequency are provided and are connected across the resistors 117 and 118 respectively. The output circuits of the amplifiers 115 and 116 are combined through condensers 121 and 122 into a common head phone circuit 123.

In the operation of the modified form of the invention shown in Fig. 3 the signal sources 70 and 71 create voltages across resistors 72 and 73 which are impressed upon the grid circuits of the tubes 75 and 76 which are variably biased for automatic volume control purposes by the D. C. voltages across the condensers 77 and 78. The voltages impressed upon the grid circuits of the tubes 75 and 76 are amplified by these tubes and energize the coils 79 and 80, which as already described are tuned to the frequency of operation by the condensers 81 and 82.

Energy from the coils 79 and 80 passes to the coils 85—88 and drives the equal rectifiers 89 and 90. The driving voltage for the rectifier 89 is the vector sum of the voltages from the coupling coils 85 and 87 and the driving voltage for the rectifier 90 is the vector sum of the voltages from the coupling coils 86 and 88. If the voltage from coil 85 is in phase quadrature with the voltage from coil 87 and if the voltage from coil 86 is in phase quadrature with the voltage from coil 88 the driving voltages, and therefore the two D. C. rectified currents, will be equal and the currents flowing through the resistors 91—94 will therefore be equal and produce equal voltage drops in these resistors. The points 96 and 99 will, therefore, become equally positive and negative and the points 97 and 98 will become equally negative and positive respectively with respect to ground. Under these conditions the points 104, 101 and 107 will be at ground potential.

When the signal voltages are not in phase quadrature the currents rectified by the rectifiers 89 and 90 are unequal. Thus, for example, when the signals approach phase equality the voltages from the coils 85 and 87 are highly additive because of like sense of coupling and the voltages from the coils 86 and 88 are highly opposite in effect because of the opposite sense of coupling, so that the rectifier 89 will rectify more current than the rectifier 90 and more current will flow through the resistors 91 and 92 than through the resistors 93 and 94, as indicated by the length of the arrows. Under these conditions the point 96 will become more positive than the point 99 becomes negative with the result that the point 104 will have a positive potential with respect to the point 101. The point 97 will become more negative than the point 98 becomes positive so that the point 107 will become negative with respect to the point 101. With opposite conditions of phase opposition the relative strength of currents will be reversed and the point 104 will become negative and the point 107 positive with respect to the point 101.

When the signal sources 70 and 71 are in phase quadrature the points 104, 101 and 107 will be of equal potential and as the battery 100 is sufficient to bias the tubes 115 and 116 beyond cut off no signal will be heard in the head phones 123. When the signal sources 70 and 71 approach phase equality the point 104 will become positive with respect to the point 101 as previously described thus decreasing the negative bias on the tube 116 which will permit this tube to amplify the energy from the tone source 120 so that the tone of the source 120 will be heard in the head phones 123. When the signal sources 70 and 71 approach phase opposition the point 107 will become positive with respect to the point 101 thus decreasing the negative bias on the tube 115 which will allow this tube to amplify the energy from the tone source 119 so that the tone of the source 119 will be heard in the head phones 123.

It is thus seen that when the signal sources 70 and 71 are in phase quadrature no tone will be heard in the head phones 123. When the signal sources 70 and 71 deviate from phase quadrature toward phase equality the tone from source 120 will be heard in the head phones 123 and when these signal sources deviate toward phase opposition the tone from source 119 will be heard in the head phones 123. In this way the deviation from phase equality may be judged by frequency and intensity of the tone heard in the head phones.

The automatic volume control system is actuated from points 97 and 99 which, under all phase conditions, are never positive with respect to the nominal bias point 101. At least one and frequently both of the points 97 and 99 is negative with respect to the point 101. The junction point 112 of the resistors 110 and 111 is therefore negative with respect to the point 101 by an amount which is determined by the amount of energy rectified by both rectifiers 89 and 90 and is fairly independent of the phase relationship.

The bias developed at the point 112 due to the rectified energy is impressed through the resistor 113 to establish automatically varied bias voltage across the condensers 77 and 78, which controls the gain of the amplifiers in accordance with the amount of output signal.

It is to be understood that the invention is not to be limited by the nature of the source of signals or the nature of the utilizations nor the nature of the unidirectional devices operating for rectifier purposes.

Although only a few of the various forms in which this invention may be embodied have been shown herein, it is to be understood that the invention is not limited to any specific construction but might be embodied in various forms without departing from the spirit of the invention or the scope of the appended claims.

What is claimed is:

1. A phase comparing circuit for comparing the phase displacement between a pair of supplied voltages, said circuit comprising a pair of vacuum tube amplifiers actuated respectively by the supplied voltages, a pair of rectifiers connected to the output circuits of said amplifiers and arranged to be actuated respectively in accordance with the vector sum and vector difference of said supplied voltages, a work circuit responsive to the differential effect of the currents rectified by said rectifiers, and means controlling the gain of said amplifiers in accordance with the total amount of rectified current whereby the operation becomes substantially independent of the amplitude of the supplied voltages.

2. A phase comparing circuit as set forth in claim 1 in which selective means is provided for controlling the gain of said amplifiers in accordance with the selected frequencies only.

3. A phase comparing circuit as set forth in claim 1 in which the gain control means is actuated in response both to changes in strength and changes in phase of the supplied voltages.

4. In a system for comparing the phases of two synchronous single phase voltages, a pair of electron discharge tubes, each of said tubes having a cathode and at least one cold electrode, connections for supplying to the corresponding pair of cold electrodes of said tubes voltages of like phase derived from one of said single phase voltages, connections for supplying on the said corresponding pair of electrodes oppositely phased voltages derived from the other of said single phase voltages, a load circuit in the output of each tube, means to obtain from the output of said tubes a voltage which is the mean of the two output voltages, and means to indicate said mean voltage.

5. In a system for comparing the phases of two synchronous single phase voltages, a pair of rectifiers, means for applying to one of the rectifiers the sum of said pair of voltages, means for applying to the other rectifier the difference of said pair of voltages, a resistor in the common output circuit of said rectifiers, said rectifiers being so poled as to cause rectified currents to flow in opposite directions to said resistor, and means to indicate the voltage across said resistor.

6. In a system for comparing the phases of two synchronous single phase voltages, means to amplify at least one of the pair of voltages, a pair of rectifiers, means for energizing one of the rectifiers with the sum of said pair of voltages after amplification, means for energizing the other of the rectifiers with the difference of the amplified voltages, means to develop voltages of opposite signs in the outputs of said rectifiers, means to derive from said developed voltages the mean of said voltages, means to indicate said mean voltage, and means to control the gain of said amplification means in accordance with the output of one of said rectifiers.

7. In a phase indicator, adapted to be used for indicating two synchronous voltages, a pair of detectors, means for applying both of said voltages to said detectors, one of the said synchronous voltages being relatively reversed in phase on one detector, resistance means in the output of each detector for developing both negative and positive voltages in each output, and means for comparing the mean of the negative output of one detector and the positive output of the other with the mean of the positive output of the one and the negative output of the other.

8. An arrangement for indicating departure and sense of departure from quadrature relationship between a pair of synchronous voltages, comprising a pair of rectifiers, means for supplying one of said voltages to each of said rectifiers in like phase, means for supplying the other of said voltages to each of said rectifiers in opposite phase relation, a load element connected with each of said rectifiers to provide a rectifier circuit, a rectified voltage being developed across each of the rectifier circuit load elements, a resistance potentiometer connected between said load elements for producing a voltage which is the mean between said rectified voltages, and indicating means connected with said potentiometer for utilizing said mean voltage.

ELLISON S. PURINGTON.